United States Patent [19]

Boyle et al.

[11] 4,344,290
[45] Aug. 17, 1982

[54] PROCESS AND APPARATUS FOR IN-LINE SLUSH MAKING FOR CONCRETE COOLING

[75] Inventors: John F. Boyle, Emmaus; Barry J. Halper, Allentown; James C. Link, Bethlehem; John C. Mullane, Jr., Allentown, all of Pa.

[73] Assignee: Air Products and Chemicals, Inc., Allentown, Pa.

[21] Appl. No.: 295,939

[22] Filed: Aug. 24, 1981

[51] Int. Cl.³ .............................................. F17C 11/00
[52] U.S. Cl. ............................................ 62/48; 62/66; 62/74; 62/216; 106/97
[58] Field of Search ................ 62/48, 66, 74, 514 R, 62/216; 106/97, 98, 99

[56] References Cited

U.S. PATENT DOCUMENTS

| | | |
|---|---|---|
| 3,643,002 | 2/1972 | Minnich ................................. 62/55 |
| 3,646,998 | 3/1972 | Curtice ................................. 106/98 |
| 3,672,182 | 6/1973 | Stowasser et al. ..................... 62/98 |
| 3,730,201 | 5/1974 | Lefever ................................. 62/55 |
| 3,771,718 | 11/1973 | Stowasser et al. .................. 239/133 |
| 4,052,220 | 10/1977 | Turpin, Jr. ............................ 106/97 |
| 4,206,610 | 6/1980 | Santhanam ............................ 62/55 |
| 4,300,355 | 11/1981 | McWhorter et al. .................... 62/48 |
| 4,305,257 | 12/1981 | Kneeland ................................ 62/48 |

Primary Examiner—Ronald C. Capossela
Attorney, Agent, or Firm—Richard A. Dannells, Jr.; E. Eugene Innis; James C. Simmons

[57] ABSTRACT

An improvement is provided in a process and apparatus for in-line slush making, for use in, for example, concrete cooling. The improvement comprises connecting the inlet used to convey liquid such as water to the manifold section of the lance so that its longitudinal axis forms an acute angle with respect to the longitudinal axis of the inlet for introducing a cryogen into the lance. This improvement substantially eliminates failure to properly make slush due to a build-up of ice within the means used to control the flow of cryogen to the system. Additional improvements to the apparatus comprise substantially aligning the sealed head of the manifold with the longitudinal axis of the inlet for conveying the liquid to the lance to eliminate and to prevent freeze-up of the liquid in the dead space found in the "T" lance design of the prior art.

12 Claims, 3 Drawing Figures

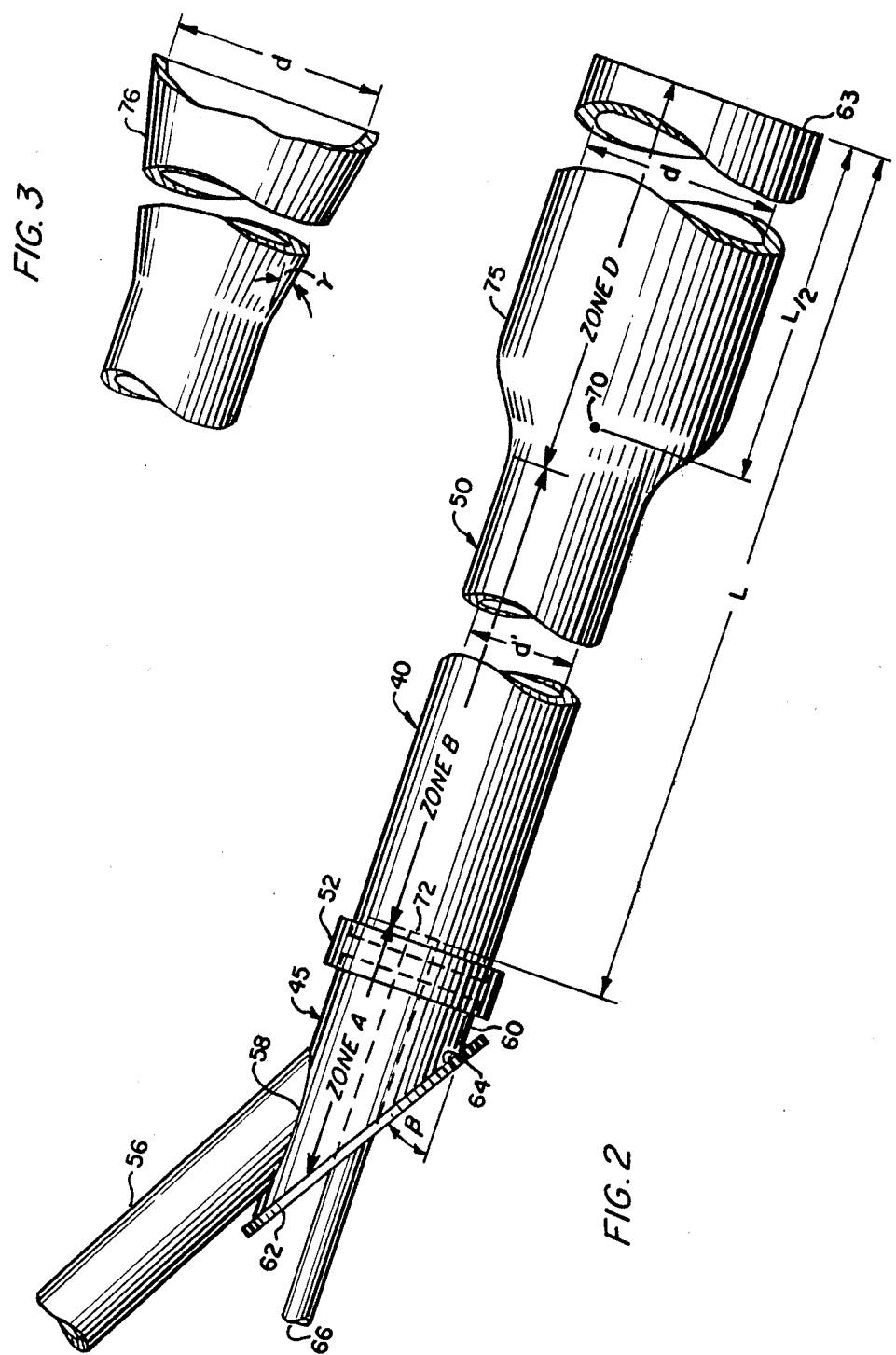

PROCESS AND APPARATUS FOR IN-LINE SLUSH MAKING FOR CONCRETE COOLING

TECHNICAL FIELD

This invention relates to a process and an apparatus for producing a flowable liquid-solid mixture, referred to as "slush", composed of a liquid mixed with discrete frozen particles of the liquid.

BACKGROUND OF THE PRIOR ART

Co-pending patent applications, Ser. Nos. 165,815 and 165,816, now U.S. Pat. Nos. 4,305,257 and 4,300,355, respectively, disclose and claim processes for producing in-line flowable slush mixtures. Specifically, in U.S. Pat. No. 4,300,355 the claimed process comprises flowing a stream of liquid, e.g. water, through a closed conduit of the slush making device, which conduit makes a tee joint with the body portion of the slush making apparatus, introducing a liquid cryogen, e.g. LIN, into the flowing water so that the water flows concurrently with the LIN to form the slush mixture which is discharged from the conduit. The criticalities of this process and that of the present process, as set forth in this U.S. Pat. No. 4,300,355 application and incorporated herein by reference, are that the temperature of the water into which the LIN is introduced must be about 2° F. above the freezing point of water to about 10° above, the contact time between the introduction of LIN and the discharge of the slush is maintained from about 0.001 to about 10 seconds, the superficial velocity of the water in the device is stated as being at least about 1.5 feet per second and finally the weight ratio of the LIN to water must be maintained from about 0.025:1 to about 2:1.

The apparatus used for carrying out both of the processes of these co-pending applications comprise an elongated cylindrical slush lance, a water inlet leg connected to the lance at a right angle thereto to form a conventional tee ("T") at the end of the lance remote from the slush discharge. Extending into the lance from a sealed end remote from the discharge and disposed coaxially with the lance is the LIN inlet line which is in sealing engagement with the sealed end.

It has been found that while operating within the scope of the process parameters claimed in these two co-pending applications, a great improvement occurs over the prior art apparatus disclosed in these applications and in U.S. Pat. Nos. 3,672,182 and 3,771,718.

The prior art "T" lance design suffers from water backing up and freezing in the cryogen or LIN inlet line and freezing the LIN solenoid valve in the open position. In addition the liquid in the dead space between the sealed end and the right angle "T" joint of the water inlet freezes, which results in a rather catastrophic failure of the entire slush making system.

BRIEF SUMMARY OF THE INVENTION

The process and apparatus of the present invention overcome the disadvantages of the apparatus disclosed in the prior art by providing features which either individually or collectively improve the overall operation of the slush making system.

The present invention comprises an improvement in an apparatus comprising a manifold which comprises a body portion having at one end thereof a sealed head and at the other end an opening, a first inlet adjacent to the sealed head to receive a liquid, a second inlet in sealing engagement with the sealed head and having its longitudinal axis substantially aligned with that of the body portion for introducing a cryogen within the manifold downstream of the first inlet; and a hollow lance having its longitudinal axis substantially aligned with the body portion and having an open end connected to the opening of the body portion and an outlet at its other end to discharge the liquid-solid mixture. The improvement comprises connecting the first inlet to the body portion so that its longitudinal axis is at an acute angle or forms a "Y" with respect to the longitudinal axis of the second inlet.

Preferably, the sealed head of the body portion of the manifold comprises a flat plate which is parallel to and in substantial alignment with the longitudinal axis of the first inlet for introducing the liquid. Also, it is preferred that the hollow lance comprises two sections of varying cross-sectional diameter. The first section which is adjacent to the body portion of the manifold is of the same or substantially the same diameter as that of the body portion. The second section adjacent to the outlet of said lance has a substantially greater cross-sectional diameter than that of the body portion.

In the prior art slush making apparatus, a "dead space" exists upstream from the tee the water inlet leg makes with manifold and the inner surface of the sealed end. As indicated in more detail below, it has been found that the freezing of the liquid in this dead space is lessened by connecting the first inlet so that its longitudinal axis forms an acute angle with that of the second inlet, preferably an angle from between about 20° and about 75°. It is much more preferable to combine this feature with that of substantially eliminating the dead space entirely by placing the inner surface of the sealed head in substantial alignment with the longitudinal axis of the first inlet and as close to the flow path of the liquid entering through this first inlet to the inner surface as it is physically possible to do so.

BRIEF DESCRIPTION OF THE DRAWING

FIG. 2 is a longitudinal view of a preferred embodiment of an apparatus of the present invention; and FIG. 3 is a longitudinal view of an alternate of zone D of the apparatus of FIG. 2.

DETAILED DESCRIPTION OF THE DRAWINGS

Figure 1:
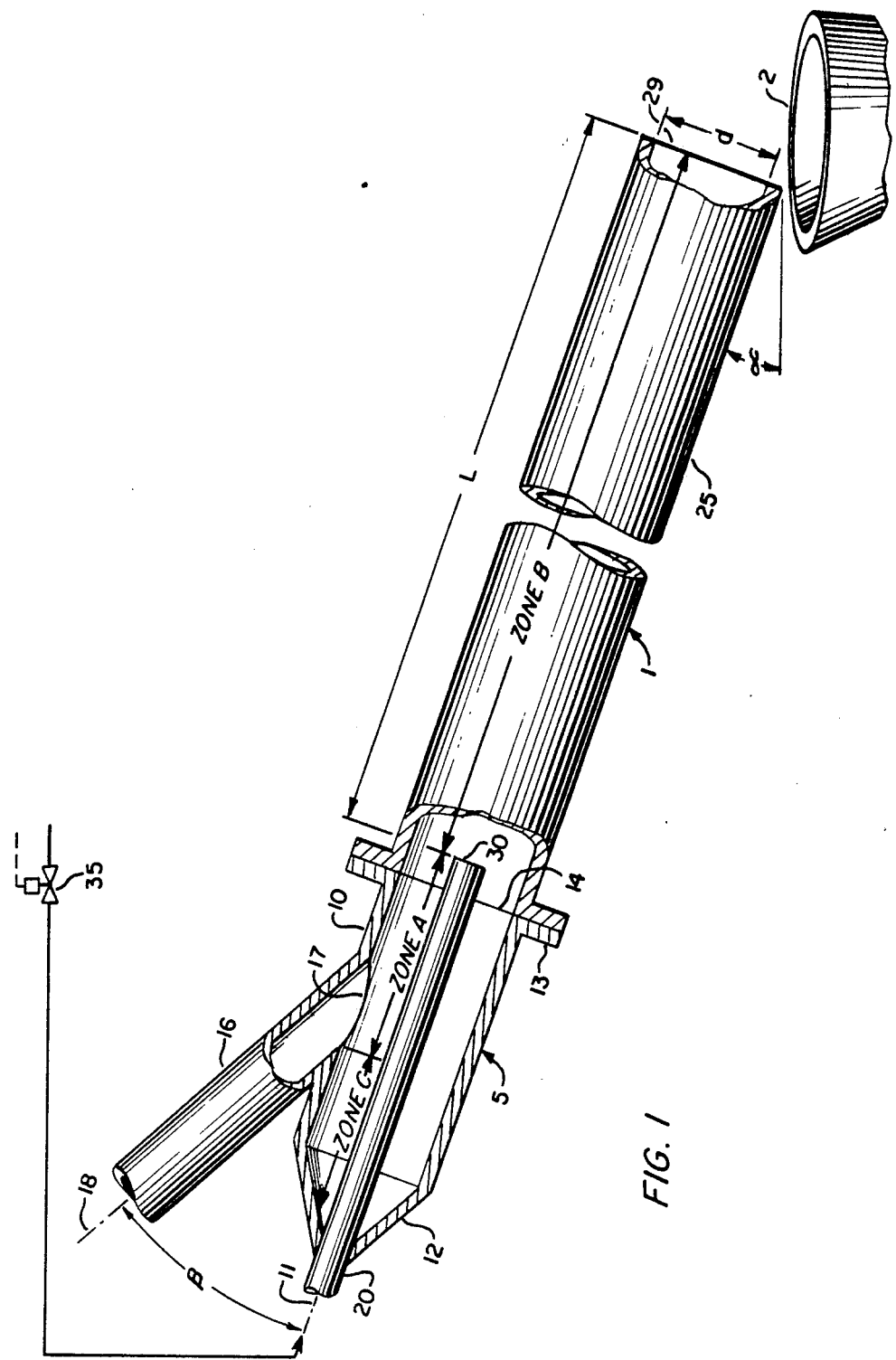
FIG. 1 is a longitudinal view, partially in cross-section, of one embodiment of the apparatus of the present invention.

The apparatus of the present invention overcomes the disadvantages of the prior art apparatus by providing means for producing a flowable slush mixture by a relatively simple and inexpensive device. This device enables one to increase the flow of cryogen which results in a higher percentage of particles of frozen liquid in the continuous liquid phase without the associated problem of blockage due to a build-up of frozen particles in the dead space and the eventual shutdown of the entire slush making system. While it is known that a number of cryogens can be employed including liquid carbon dioxide, liquid ethane, liquid propane, liquid nitrogen and liquid air to cool such liquids as methyl alcohol, ethylene glycol, kerosene, acetone, water and the like, for simplification, the present apparatus will be described in reference to the use of LIN to make an ice-water slush for use primarily in the production of concrete.

Referring now to FIG. 1, slush making apparatus 1 is shown being directed to hopper 2 (shown in part) of a concrete mixer (not shown). At the end of slush making apparatus 1, remote from hopper 2 is manifold 5, which comprises body 10 having longitudinal axis 11 that is common to the entire slush making apparatus and having at one end thereof sealed head 12 and at the other end flange 13 encircling opening 14. Water conduit 16 is welded or otherwise suitably attached to orifice 17 in the sidewall of body 10 so that its longitudinal axis 18 forms an acute angle $\beta$ of approximately 30° with respect to longitudinal axis 11 of both body 10 and LIN conduit 20. LIN conduit 20 is maintained in sealing engagement with sealed head 12 and is disposed through body 10 and extends past flanged opening 14 to assure that the LIN enters slush making apparatus 1 downstream of water orifice 17. Hollow lance 25 is connected to manifold 5 by means of flange 13. Outlet 29 of lance 25 at the opposite end from flange 13 is for discharging the slurry into hopper 2. The inner diameter of both lance 25 and body 10 of manifold 5 is designated by the letter "d". The distance between opening 30 in the end of LIN inlet 20 and discharge outlet 29 is designated by the letter "L". The angle that apparatus 1 forms with the horizontal is designated by $\alpha$, which ranges from about 0 to 90, preferably in the range of 50° to 90°. The flow of LIN from a storage vessel (not shown) to LIN conduit 20 is controlled by means of solenoid valve 35. The valve is positioned at a distance of 2 to 30 feet from orifice 17, preferably about 4–8 feet.

In operation, water flows through water inlet 16 and is introduced into slush making apparatus 1 in the annular space between the outer walls of LIN inlet 20 and the inner walls of body 10 while the water flows through this space, LIN is introduced into apparatus 1 by means of LIN inlet line 20 so that it meets the water and flows concurrently with the water downstream of LIN inlet opening 30. The slush mixture is formed within lance 25 through the contact of LIN and water and is discharged from lance 25 at discharge outlet 29.

It is critical that a finite distance exists between the entry point of the water at orifice 17 and LIN entry point at opening 30, downstream from orifice 17. This permits water to become established in an annular flow regime and to form a concentric annulus around the stream of LIN at its point of discharge. This practice avoids a build-up of ice on the inner surface of the lance. However, once the heat transfer process begins between the water at a temperature greater than 33° F. and LIN at $-320°$ F. and the thermodynamic state of the fluids begin to change, annular flow is no longer maintained. Downstream from opening 30, the turbulent flow of water and LIN causes the two to become thoroughly mixed, the LIN to become vaporized and the water to form small, discrete particles of ice. This turbulent flow of LIN, water, nitrogen and ice also aids in the heat transfer process by changing the process from a macro to a micro fluid volume to surface ratio. The process optimally occurs in a volume sized so that void spaces are avoided and the four phase mixture is slightly compressed which increases its velocity. This increased velocity prevents ice particles from adhering to the sides of the lance.

In FIG. 1, Zone A is shown as that region of the apparatus in which the water develops an annular flow, Zone B is that portion of the apparatus where the heat transfer process between LIN and water takes place and Zone C is the area in which no flow takes place. This latter so called dead zone is the region in which icing is likely to occur and to cause orifice 17 to close and shut down the entire system.

FIG. 1 depicts the apparatus in which the length, L, from LIN injection opening 30 to discharge outlet 29 is at least about three times the inner diameter d, of lance 25. Preferably, the ratio of L:d is at least about 10 to 1 and preferably at least about 20:1. Excessively high L:d ratios provide no advantage and may even result in being counterproductive because the slush mixture may tend to melt if lance 25 is too long. Therefore, it is preferable to maintain the L:d ratio at less than about 200:1 and more preferably at less than about 150:1 or even less than about 100:1.

Referring now to FIG. 2, slush making apparatus 40 is shown with manifold 45 coupled to hollow lance 50 by means of coupling 52. Manifold 45 comprises water inlet 56 welded to opening 58. Sealed head 62 is positioned remote from slush discharge outlet 63 and positioned in such a manner that its surface is parallel and aligned with the longitudinal axis of water inlet 56, which makes an acute angle with respect to the longitudinal axis of apparatus 40 as described above in connection with FIG. 1, and as close as possible to opening 58, so that the dead space between water inlet orifice 58 and inner surface 64 of sealed head 62 is non-existent or at least kept to an absolute minimum. Cryogen inlet 66 is mounted in sealing engagement with sealed head 62 in the same manner as described above in connection with FIG. 1.

Lance 50 is shown having a section adjacent to discharge 63 which has a diameter "d" substantially larger than the section adjacent coupling 52. The latter section has an inner diameter d' having a size equal to approximately d/2. It is preferable to maintain the ratio of d to d' at greater than 1:1, preferably in the range of about 1.2:1 to about 5:1. The distance from center point 70 of the transition between the section 75 having diameter d to the section of diameter d' is shown to be half that of the total length, L, of the section from cryogen outlet 72 to slush discharge 63. It is contemplated that the length of the section of diameter d can range from about 30 to 80% of L.

It is also contemplated that the Zone D of lance 50 adjacent to discharge outlet 63 can form a conical section rather than having its walls flared in a smooth transition as shown in FIG. 2. In FIG. 3, conical section 76 is shown in which the angle $\gamma$ is that which the sidewalls of this section make with the longitudinal axis of lance 50 and ranges from approximately from 1° to 45°.

It has been found that as the LIN vaporizes to many times the volume of its liquid state, the gas must be allowed to expand for the slush making system to operate efficiently and to prevent an undesirable back pressure in Zone B. In Zone B as discussed above, the LIN and water make initial contact and only a small amount of LIN becomes vaporized. This occurs because the initial temperatures are very cold. However, near the end of Zone B when the LIN has become completely vaporized and warmed such that the existing volume of the apparatus is no longer capable of handling the 3 phase mixture, the increased diameter of Zone D accommodates this expanding volume of gas. Additional heat transfer occurs along the length of Zone D until the water, ice and nitrogen gas reach a uniform temperature. When this equilibrium has been reached in Zone D, additional length is unnecessary as further effective heat transfer can no longer occur. In fact, if the length of Zone D was longer then necessary, the ambient air surrounding the lance would cause a melting of the ice. The flow of the slush leaving discharge 63 is at a high, but controlled velocity for being propelled into the hopper of concrete mixture. In contrast, the slush leaving Zone B through discharge 29 of the apparatus of FIG. 1 is at an uncontrolled velocity causing splattering and loss of slush.

It is preferred that the apparatus be fabricated out of a material which is not likely to distort such as stainless steel and that the inner surface of the apparatus be coated and/or impregnated with Teflon ® fluorocarbon to provide a low frictional surface. The surface enhances the flow by reducing the pressure drop in the apparatus and the Teflon surface has a tendency for reduced accumulation of ice which further assists in decreasing the probability of blockage.

If additional cooling is necessary for the slush leaving discharge outlet 63, LIN can be sprayed directly into the slush as it leaves apparatus 40. However, this is recommended only if absolutely necessary because it tends to be a much less efficient method.

The chief advantages of the apparatus of this invention are to increase the ice to water ratio and to improve the overall reliability of the slush making system over that of the prior art apparatus. The apparatus combines a manifold which optimizes the heat transfer between the two mixing fluids by changing the orientation of the water inlet from the perpendicular to an acute angle with respect to the LIN inlet and thus substantially eliminating the freezing up of solenoid valve 35 that controls the flow of the cryogen to the lance. By redesigning sealed head 62 in the preferred manner as shown in FIG. 2, the dead zone defined as Zone C in FIG. 1 is eliminated which prevents the ice build-up therein. The water is guided in such a manner that it completely surrounds the LIN inlet and this annular flow results in improved heat transfer and increased ice to water ratios over the prior art processes. Following the manifold section is the relatively small diameter mixing section in which the LIN is vaporized and a portion of the water freezes into discrete particles. At the point the liquid turns to gas, the apparatus is flared to allow it to expand and to reduce the back pressure as indicated above. Increased LIN flow increases the ice to water ratio if the water flow rate is maintained constant. One of the major problems with prior art slush making systems was the propensity of ice to accumulate inside the lance leading eventually to a system failure. Therefore, by incorporating the above features the ice build-up problem has been all but eliminated.

The following nonlimiting examples compare the results of making slush by the devices of FIGS. 1 and 2 with those obtained by the "T" design of the prior art.

EXAMPLE 1

Slush making apparatus 1 was used in this example except that a threaded connector was employed of the type shown in FIG. 2 rather than flange 13. The inside diameter (i.d.) of manifold body 10 and lance 25 was 4 in. LIN conduit 20 had an i.d. of 1½ in. and a length of about 16 in. from the inner weld line conduit 20 made with sealed head 12 to opening 30. Water conduit 16 had a 2 in. i.d. and was positioned so that the center line of orifice 17 was approximately 8 in. from the opening 30 and made an angle of 30° with respect to the longitudinal axis of LIN conduit 20. In this "Y" design, water was at the ambient temperature of 76° F. and was flowing at a rate of 100 gallons per minute (gpm) to form an annulus within this 8 in. distance before it came into contact with the LIN, which was flowing out of opening 30 at 81.75 gpm. The resulting slush discharging from outlet 29 contained 42.5% ice. The "Y" design operated without solenoid valve 35 freeze-ups and at much higher ice to water ratio in the slush than the control "T" design exemplified below.

CONTROL

The basic dimensions of each of the parts making up the control device were the same as the Example 1 apparatus except that the i.d. of body 10 and lance 25 was 3 in. instead of 4 in. The basic difference between the two devices is that water conduit 16 made a conventional 90° "T" with body 10. Table 1 below compares the operating variables and results obtained with the Control device with those of Examples 1 and 2.

Experience has demonstrated that the conventional "T" design resulted in LIN solenoid valve freeze-ups on the average of 1 major failure per week and ice build-ups within the dead zone, Zone C. In at least one case, the entire control device was propelled a distance of about 10 feet due to this ice build-up.

EXAMPLE 2

Apparatus 40 shown in FIG. 2 was used in which LIN conduit 66, water conduit 56 and Zones A and B had i.d.'s of 1½ in., 2 in. and 4 in., respectively and the "d" of flared section 75 was 6 in. Sealed head 62 was positioned at the end of apparatus 40 opposite discharge 63 so that it was aligned at the 30° acute angle with the longitudinal axis of water conduit 56 made with that of LIN conduit 66. In addition, head 62 was welded to manifold 45 so that its inner surface was substantially flush with the flow path of the water entering through orifice 58. The lengths of Zones A, B and D were 10 in., 5 ft. and 5 ft., respectively.

The operating parameters and results are summarized in Table 1 below. The apparatus of FIG. 2 resulted in the production of slush having a greater ice to water ratio without icing problems than either that of Example 1 or the control apparatus.

TABLE 1

|  | Flow Rates, gpm | | Temperature | Ice |
| --- | --- | --- | --- | --- |
|  | LIN | Water | Inlet Water, °F. | % |
| CONTROL | 35 | 80 | 55 | 23 |
| EXAMPLE 1 | 81.75 | 100 | 76 | 42.5 |
| EXAMPLE 2 | 83 | 140 | 42 | 46 |

What is claimed is:

1. In an apparatus for producing a flowable liquid-solid mixture comprising a continuous liquid phase mixed with a discrete, discontinuous solid phase of frozen particles of the liquid, which apparatus comprises a manifold having a body portion having at one end thereof a sealed head and at the other end an opening, first inlet adjacent to the sealed head to receive a liquid, a second inlet in sealing engagement with the sealed head and having its longitudinal axis substantially aligned with that of said body portion for introducing a cryogen within said manifold downstream of said first inlet; and a hollow lance having its longitudinal axis substantially aligned with that of said body portion and having an open end connected to the opening of said body portion and an outlet at its other end to discharge the liquid-solid mixture, the improvement which comprises said first inlet being connected to said body portion so that its longitudinal axis is at an acute angle with respect to the longitudinal axis of said second inlet.

2. The apparatus of claim 1 wherein the sealed head of said body portion of said manifold comprises a flat plate which is in substantial alignment with the longitudinal axis of said first inlet.

3. The apparatus of claim 1 wherein said hollow lance comprises two sections of varying cross-sectional diameter, a first section adjacent to said body portion of said manifold being of substantially the same diameter as said body portion and a second section adjacent to said outlet of said lance being of substantially greater cross-sectional diameter than that of said body portion of said manifold.

4. The apparatus of claim 3 wherein the cross-sectional diameter of said second section is greater than 1:1 to that of said first section.

5. The apparatus of claim 4 wherein the cross-sectional diameter of said second section is about 1.2 to about 5 times that of said first section.

6. The apparatus of claim 3 wherein said second section of said hollow lance having a diameter substantially greater than that of said body portion of said manifold is spaced a substantial length downstream from the opening in said second inlet within said manifold.

7. The apparatus of claim 6 wherein said second section ranges from about 30 to about 80% of the total length between the opening in said second inlet and said outlet of said hollow lance.

8. The apparatus of claim 3 wherein said second section has a conical shape.

9. The apparatus of claim 1 wherein means for controlling the flow of cryogen is operably connected to said second inlet, whereby said means operates substantially without failure due to the build-up of ice in said means.

10. The apparatus of claim 1 wherein said acute angle is within the range from about 20° to about 75°.

11. In a process for producing a flowable liquid-solid mixture comprising a continuous liquid phase and a discontinuous solid phase comprised of discrete, frozen particles of the liquid, which process comprises flowing a stream of the liquid through a closed conduit, introducing a cryogen into the closed conduit and into the flowing liquid stream so as to flow concurrently therewith, whereby the liquid-solid mixture is formed, and discharging the mixture from the conduit, the contact time between introduction of the cryogen and discharge of the mixture being between about 0.001 to about 10 seconds, the superficial velocity of the flowing liquid being at least 1.5 feet per second, the weight ratio of cryogen to liquid being maintained at about 0.025:1 to about 2:1 and the temperature of the liquid stream into which the cryogen is introduced being established within the range from about 2° F. above the freezing point of the liquid to about 10° F. above the freezing point of the liquid, the improvement which comprises introducing the liquid into said closed conduit at an acute angle with respect to the flow path of the cryogen and continuously controlling the flow of said cryogen by control means, whereby said control means can be operated substantially without failure due to a build-up of frozen liquid.

12. The process of claim 11 wherein the liquid is introduced at an angle B within the range from about 20° to about 75°.

* * * * *